United States Patent
Baier et al.

(10) Patent No.: US 9,582,234 B2
(45) Date of Patent: Feb. 28, 2017

(54) SYSTEM AND METHOD FOR THE AUTOMATIC AGGREGATION OF INDUSTRIAL AUTOMATION DISPLAYS

(75) Inventors: John Joseph Baier, Mentor, OH (US); Kevin George Gordon, Vancouver (CA); Mark David Hobbs, Hartford, WI (US); Monte Leroy Fevang, Surrey (CA); Teunis Hendrik Schouten, Langley (CA); Karen Kui, Surrey (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 896 days.

(21) Appl. No.: 12/242,720

(22) Filed: Sep. 30, 2008

(65) Prior Publication Data

US 2010/0082131 A1    Apr. 1, 2010

(51) Int. Cl.
*G06F 3/048* (2013.01)
*G06F 3/14* (2006.01)
*G06F 17/30* (2006.01)

(52) U.S. Cl.
CPC .......... *G06F 3/14* (2013.01); *G06F 17/30017* (2013.01)

(58) Field of Classification Search
CPC .............................. G06F 3/14; G06F 17/30017
USPC ........................................ 700/83; 715/771, 83
See application file for complete search history.

(56) References Cited

U.S. PATENT DOCUMENTS

| | | | |
|---|---|---|---|
| 6,317,701 B1 * | 11/2001 | Pyotsia et al. ................ 702/188 |
| 6,336,053 B1 * | 1/2002 | Beatty ........................... 700/108 |
| 6,965,855 B1 * | 11/2005 | Burbridge et al. ............. 703/22 |
| 7,146,408 B1 | 12/2006 | Crater et al. | |
| 7,225,109 B2 * | 5/2007 | Frerichs et al. ............... 702/185 |
| 7,925,979 B2 * | 4/2011 | Forney et al. ................. 715/733 |
| 8,000,814 B2 * | 8/2011 | Havekost ........... G05B 19/0426 340/3.1 |
| 8,127,241 B2 * | 2/2012 | Blevins et al. ................ 715/771 |
| 8,144,150 B2 * | 3/2012 | Gilbert ............... G05B 19/0426 345/440 |
| 2002/0022894 A1 * | 2/2002 | Eryurek ................ G03F 7/0007 700/80 |
| 2002/0067370 A1 * | 6/2002 | Forney et al. ................. 345/742 |
| 2002/0077711 A1 * | 6/2002 | Nixon et al. ..................... 700/51 |
| 2002/0123864 A1 * | 9/2002 | Eryurek et al. ............... 702/188 |
| 2002/0163427 A1 * | 11/2002 | Eryurek et al. ............... 340/500 |
| 2004/0162887 A1 * | 8/2004 | Dillon et al. .................. 709/217 |
| 2004/0204775 A1 * | 10/2004 | Keyes et al. ..................... 700/29 |
| 2004/0230328 A1 * | 11/2004 | Armstrong et al. ............. 700/83 |

(Continued)

*Primary Examiner* — William Bashore
*Assistant Examiner* — Gregory A Distefano (57) ABSTRACT

A data aggregation system comprises an aggregation server. The aggregation server receives from a Human-Machine Interface (HMI) graphics data comprising a graphical representation of a portion of an industrial automation environment over an enterprise network, receives operation data associated with an operation of the industrial automation environment over the enterprise network, and receives a request for a viewing session from a plurality of communication devices over a communication network. In response to the request, the aggregation server transfers the graphics data over the communication network to the plurality of communication devices. In response to the request, the aggregation server transfers the operation data over the communication network to the plurality of communication devices.

14 Claims, 7 Drawing Sheets

(56) References Cited

U.S. PATENT DOCUMENTS

| | | | |
|---|---|---|---|
| 2005/0027376 A1* | 2/2005 | Lucas | G05B 19/0426 700/28 |
| 2005/0222698 A1* | 10/2005 | Eryurek et al. | 700/90 |
| 2005/0257204 A1* | 11/2005 | Bryant | G06F 3/0481 717/163 |
| 2006/0087402 A1* | 4/2006 | Manning et al. | 340/3.1 |
| 2006/0184508 A1* | 8/2006 | Fuselier | G06Q 10/06 |
| 2006/0190584 A1* | 8/2006 | Skold et al. | 709/223 |
| 2007/0067142 A1* | 3/2007 | Kavaklioglu et al. | 702/182 |
| 2007/0129917 A1* | 6/2007 | Blevins | G05B 17/02 703/6 |
| 2008/0267067 A1* | 10/2008 | Salazar | H04L 47/10 370/235 |
| 2009/0086021 A1* | 4/2009 | Baier et al. | 348/143 |
| 2011/0270959 A1* | 11/2011 | Schlusser | G06F 9/4443 709/223 |

\* cited by examiner

SYSTEM AND METHOD FOR THE AUTOMATIC AGGREGATION OF INDUSTRIAL AUTOMATION DISPLAYS

TECHNICAL FIELD

This disclosure is related to the field of factory automation, and in particular, to the automatic aggregation of industrial automation displays.

TECHNICAL BACKGROUND

Industrial automation environments include automobile manufacturing factories, food processing plants, and microprocessor fabrication facilities. The typical industrial environment includes various machines, such as pumps, motors, and robots. These machines continually produce data that indicates the current status of the machines, such as the machine's pressure, temperature, or speed.

The typical industrial environment also includes a Human-Machine Interface (HMI). The HMI can display a graphical representation of an industrial automation environment, including graphical representations of machines. The HMI also receives and processes operation data from the machines to generate various graphical displays. The graphical displays indicate the current and historical status of the machines. For example, an HMI graphical display might indicate the pressure of a pump, the speed of a motor, or the output of a robot.

A user may remotely operate a communication device to access a communication network of an industrial automation environment. The communication device functions as a remote HMI and retrieves operation data from the machines and graphics data from the HMI over a communication network. Unfortunately, frequent requests for such data from multiple communication devices puts strain on the HMI, the machines, and the network.

TECHNICAL SUMMARY

A data aggregation system comprises an aggregation server. The aggregation server receives from a Human-Machine Interface (HMI) graphics data comprising a graphical representation of a portion of an industrial automation environment over an enterprise network, receives operation data associated with an operation of the industrial automation environment over the enterprise network, and receives a request for a viewing session from a plurality of communication devices over a communication network. In response to the request, the aggregation server transfers the graphics data over the communication network to the plurality of communication devices. In response to the request, the aggregation server transfers the operation data over the communication network to the plurality of communication devices.

In some examples, the aggregation server is configured to receive the operation data from a machine system.

In some examples, the aggregation server is configured to receive the operation data from the Human-Machine Interface (HMI).

In some examples, the graphics data and the operation data are contained in a single file.

In some examples, the graphics data and the operation data are contained in a single web page.

In some examples, the aggregation server is configured to receive configuration data comprising a configuration of the portion of the industrial automation environment over the enterprise network.

In some examples, one of the plurality of communication devices is a remote Human-Machine Interface (HMI).

Also disclosed herein is a method of operating a data aggregation system wherein the method comprises receiving from a Human-Machine Interface (HMI) graphics data comprising a graphical representation of a portion of an industrial automation environment over an enterprise network, receiving operation data associated with an operation of the industrial automation environment over the enterprise network, receiving a request for a viewing session from a plurality of communication devices over a communication network, in response to the request, transferring the graphics data over the communication network to the plurality of communication devices, and in response to the request, transferring the operation data over the communication network to the plurality of communication devices.

Also disclosed herein is a computer-readable storage medium comprising instructions executable by a processing system for employing a method of operating a data aggregation system wherein the method comprises receiving from a Human-Machine Interface (HMI) graphics data comprising a graphical representation of a portion of an industrial automation environment over an enterprise network, receiving operation data associated with an operation of the industrial automation environment over the enterprise network, receiving a request for a viewing session from a plurality of communication devices over a communication network, in response to the request, transferring the graphics data over the communication network to the plurality of communication devices, and in response to the request, transferring the operation data over the communication network to the plurality of communication devices.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Described herein is a method of operating a data aggregation system. An aggregation server is placed in communication with a Human-Machine Interface (HMI) system and machine systems to automatically cache data generated by such systems. Requests for operation data and graphics data from remote communication devices are serviced by the aggregation server. Thus, by utilizing the aggregation server, the HMI and machine systems are not required to provide such data to communication devices on demand. Additionally, strain on enterprise network resources is reduced through use of the aggregation server.

Figure 1:
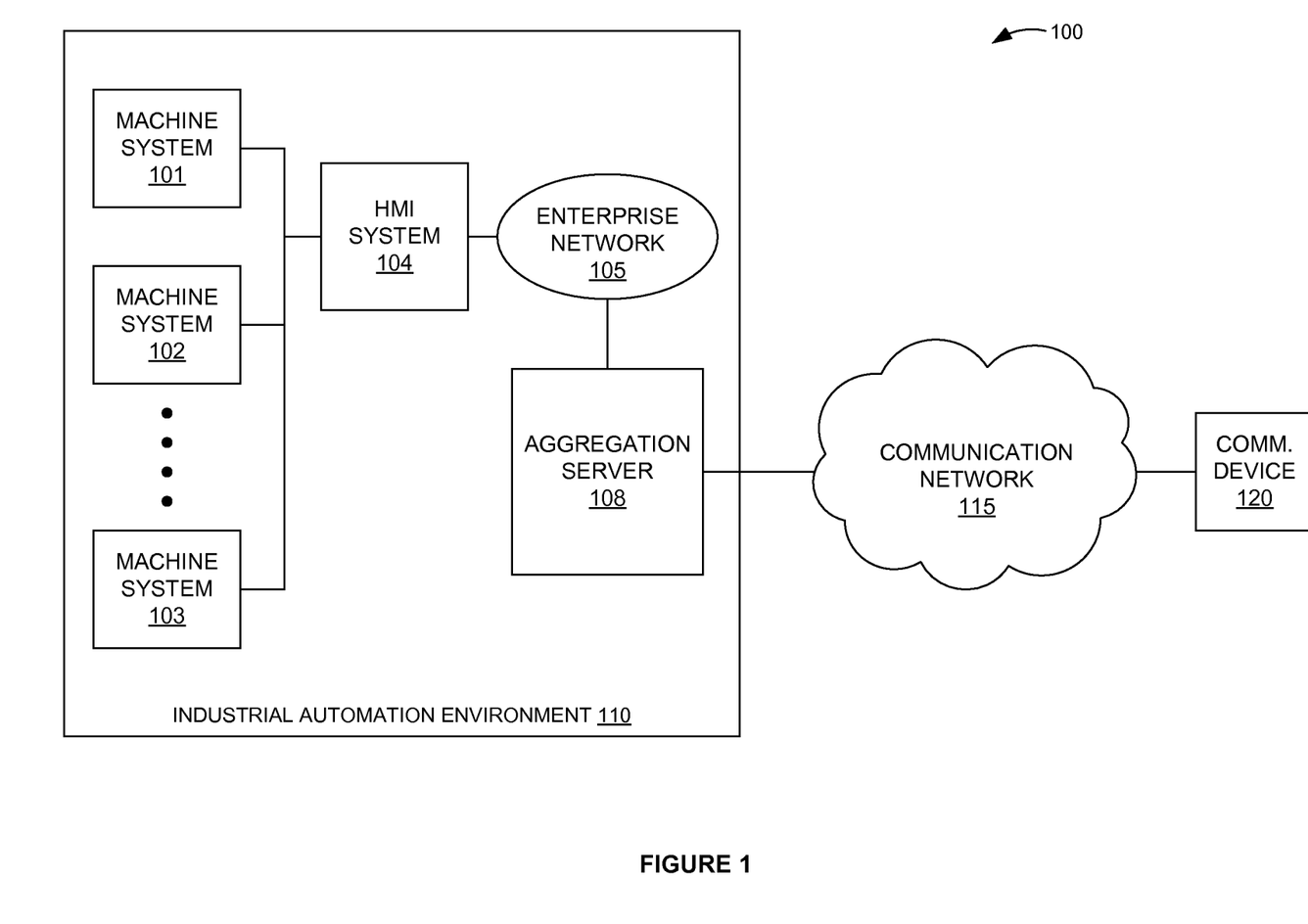
FIG. 1 is a block diagram illustrating a data aggregation system.

FIG. 1 is a block diagram illustrating data aggregation system 100. Data aggregation system 100 comprises machine systems 101-103, Human-Machine Interface (HMI) system 104, enterprise network 105, aggregation server 108, communication network 115, and communication device 120. The number of machine systems, HMI systems, and communication devices shown in FIG. 1 has been restricted for clarity, but there would typically be many more. HMI system 104 and aggregation server 108 communicate over enterprise network 105. Aggregation server 108 and communication device 120 communicate over communication network 115.

Industrial automation environment 110 includes machine systems 101-103, HMI system 104, enterprise network 105, and aggregation server 108. Industrial automation environment 110 comprises an automobile manufacturing factory, food processing plant, microprocessor fabrication facility, or some other type of industrial enterprise. Note that aggregation server 108 may not be located at the same physical premises as machine systems 101-103, but may be in communication with HMI system 104 over enterprise network 105 from many miles away.

Machine systems 101-103 comprise pumps, motors, robots, or some other mechanical apparatus, including their associated control systems. A control system comprises, for example, a programmable logic controller (PLC). In addition, machine systems 101-103 comprise other, non-mechanical elements, such as a brew kettle in a brewery, a reserve of coal or other resources, or any other element that may reside in an industrial automation environment 110.

Machine systems 101-103 continually produce operation data over time. The operation data indicates the current status of machine systems 101-103, such as pressure, temperature, speed, or some other status metrics. Machine systems 101-103 are in communication with HMI system 104 and continually transfer the operation data to HMI system 104 over wireless links, metallic links, optical links, or some other communication link, including combinations thereof. In addition, HMI system 104 transfers control instructions to machine systems 101-103.

HMI system 104 comprises computer and communication equipment and software. HMI system 104 displays graphics data comprising a graphical representation of an industrial automation environment 110, including graphical representations of machine systems 101-103. HMI system 104 also continually receives operation data from machine systems 101-103. HMI system 104 may process the operation data to generate various graphical displays indicating the current and historical status of machine systems 101-103. Such graphical displays are a graphical representation of the operation data. For example, an HMI system 104 graphical display might indicate the pressure of a pump, the speed of a motor, the output of a robot, the amount of coal remaining, or some other status metric. HMI system 104 also controls machine systems 101-103. For example, HMI system 104 might turn on a pump, speed-up a motor, stop a robot, boil a brew kettle, or perform some other type of machine control. Examples of HMI systems that could be adapted in accord with this description comprise RSView® or PanelView Plus™ supplied by Rockwell Automation—including combinations thereof.

HMI system 104 comprises a machine interface, a processing system, a storage system, a user interface, a communication interface, and a communication system. The user interface includes a display device. The storage system stores HMI software.

The machine interface comprises communication circuitry and equipment that communicates with machine systems 101-103. The processing system comprises microprocessors or other logic circuitry that retrieves and executes the HMI software. The communication interface comprises communication circuitry and equipment that communicates with aggregation server 108 over enterprise network 105. The user interface comprises a keyboard, mouse, voice recognition interface, touch screen, touch pad, or some other user device. The display device comprises a touch screen, liquid crystal display, cathode ray tube display, or some other graphical display mechanism. The storage system comprises a disk, integrated circuit, flash drive, optical media, or some other memory device. The communication system comprises a bus, local area network, or some other communication apparatus. The above-described components of HMI system 104 may be integrated together or distributed among multiple devices.

The HMI software comprises an application program, firmware, or some other form of machine-readable processing instructions. The HMI software may include an operating system, utilities, drivers, networking, and applications. When executed by the processing system, the HMI software directs HMI system 104 to operate as described herein.

Enterprise network 105 uses the internet protocol, Ethernet, telephony, or some other communication protocol, including combinations thereof. Enterprise network 105 uses wireless links, metallic links, optical links, or some other communication link, including combinations thereof. Enterprise network 105 comprises the Internet, a private network, a telephone network, or some other communication network, including combinations thereof. Enterprise network 105 could be a local area network, wide area network, or some other data network. HMI system 104 communicates with aggregation server 108 over enterprise network 105.

Aggregation server 108 comprises computer and communication equipment and software. Aggregation server 108 continually receives and stores graphics data and operation data from HMI system 104 over enterprise network 105. The graphics data comprises a graphical representation of an industrial automation environment, including graphical representations of machine systems 101-103. Aggregation server 108 receives requests over communication network 115 from communication device 120 for the graphics data and the operation data. Aggregation server 108 sends the graphics data and the operation data over communication network 115 to communication device 120. An example of an aggregation server that could be adapted in accord with this description is a FactoryTalk® ViewPoint server supplied by Rockwell Automation.

Communication network 115 uses the internet protocol, Ethernet, telephony, or some other communication protocol, including combinations thereof. Communication network 115 uses wireless links, metallic links, optical links, or some other communication link, including combinations thereof. Communication network 115 comprises the Internet, a private network, a telephone network, or some other communication network, including combinations thereof. Aggregation server 108 communicates with communication device 120 over communication network 115.

Communication device 120 comprises a telephone, wireless transceiver, computer, digital assistant, Internet appliance, or some other communication apparatus. Communication device 120 receives operation data and graphics data from aggregation server 108. Communication device 120 displays the operation data and graphics data. In addition, communication device 120 may process the operation data to generate graphical representations of the operation data. In one embodiment, communication device 120 comprises a computer with an Internet browser and Microsoft® Silverlight™ software installed thereon.

Communication device 120 comprises a communication interface, processing circuitry, a storage device, a user interface, and a communication system. The user interface includes a display device. The storage device stores communication device software.

The communication interface comprises communication circuitry and equipment that communicates with aggregation server 108 over communication network 115. The processing circuitry comprises microprocessors or other logic circuitry that retrieves and executes the communication device software. The storage device comprises a disk, integrated circuit, flash drive, or some other memory device. The user interface comprises a keyboard, mouse, voice recognition interface, touch screen, or some other user device. The user interface may also include a touch pad, wheel, or some other mechanism that allows a user to input a scroll command. The display device comprises a liquid crystal display, cathode ray tube display, or some other graphical display mechanism. The communication system comprises a bus, communication circuitry, or some other communication apparatus. The above-described components of communication device 120 may be integrated together or distributed among multiple devices.

The communication device software comprises an application program, firmware, or some other form of machine-readable processing instructions. The communication device software may include an operating system, utilities, drivers, networking, and applications. When executed by the processing circuitry, the communication device software directs communication device 120 to operate as described herein.

Figure 2:
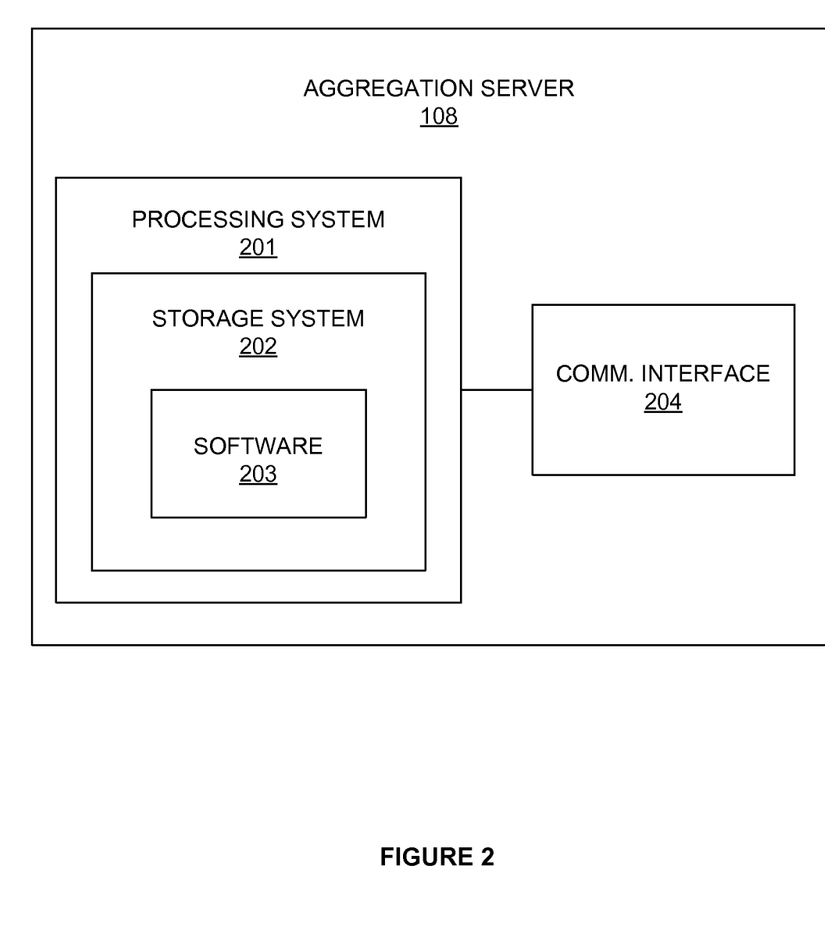
FIG. 2 is a block diagram illustrating an aggregation server.

FIG. 2 is a block diagram illustrating aggregation server 108. Aggregation server 108 comprises communication interface 204 and processing system 201. Processing system 201 includes storage system 202. Storage system 202 stores software 203. Processing system 201 is linked to communication interface 204. Aggregation server 108 could be comprised of a programmed general-purpose computer, although those skilled in the art will appreciate that programmable or special purpose circuitry and equipment may be used. Aggregation server 108 may be distributed among multiple devices that together comprise elements 201-204.

Communication interface 204 could comprise a network interface, modem, port, transceiver, or some other communication device. Communication interface 204 may be distributed among multiple communication devices. Processing system 201 could comprise a computer microprocessor, logic circuit, or some other processing device. Processing system 201 may be distributed among multiple processing devices. Storage system 202 could comprise a disk, tape, integrated circuit, server, or some other memory device. Storage system 202 may be distributed among multiple memory devices.

Processing system 201 retrieves and executes software 203 from storage system 202. Software 203 may comprise an operating system, utilities, drivers, networking software, and other software typically loaded onto a computer system. Software 203 could comprise an application program, firmware, or some other form of machine-readable processing instructions. When executed by processing system 201, software 203 directs aggregation server 108 to operate as described herein.

Figure 3:
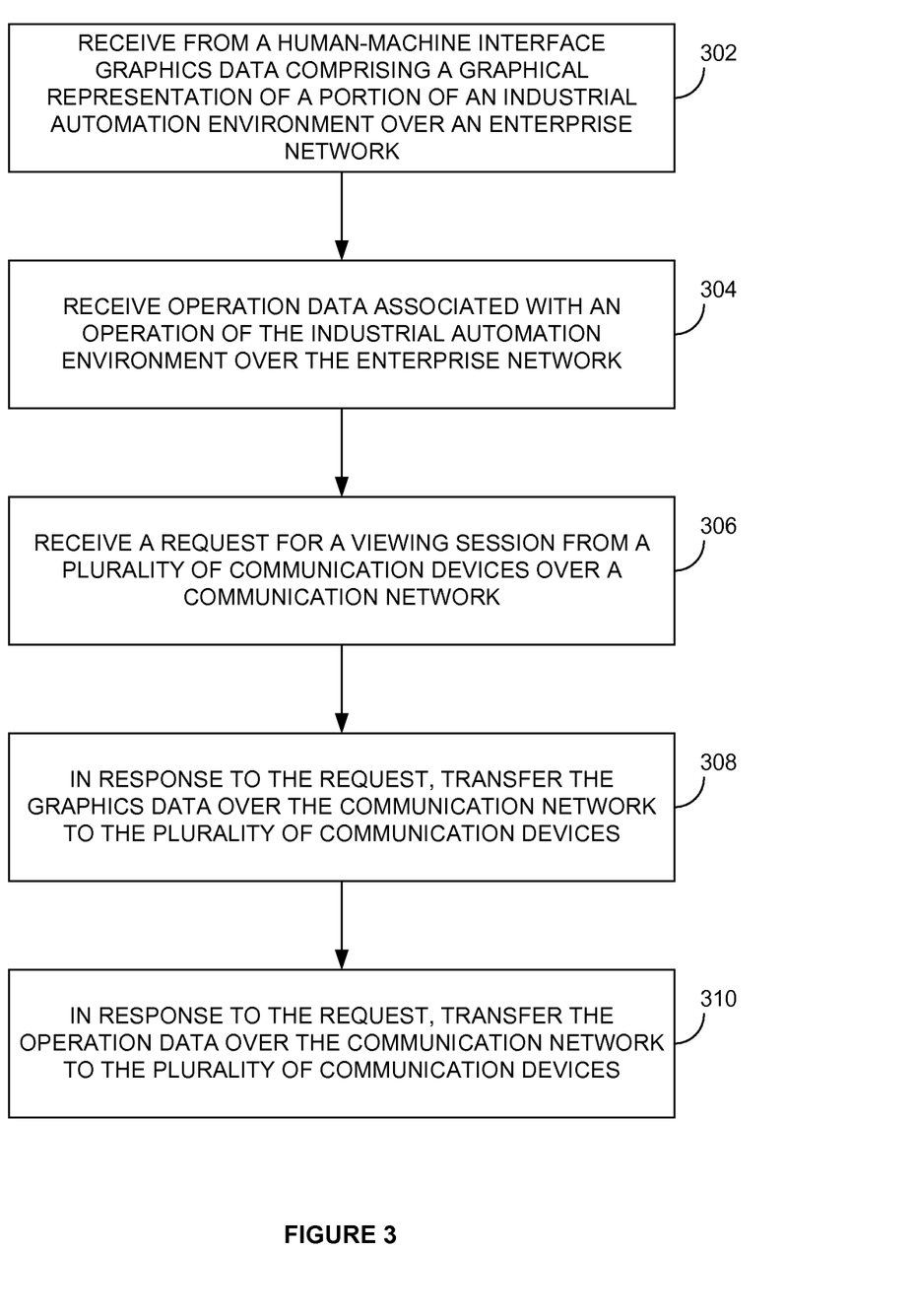
FIG. 3 is a flow diagram illustrating a method of operating an industrial automation environment.

FIG. 3 is a flow diagram illustrating a method of operating a data aggregation system, such as data aggregation system 100. Aggregation server 108 receives from HMI system 104 graphics data comprising a graphical representation of a portion of an industrial automation environment over an enterprise network 105 (operation 302). For example, the graphics data may comprise a graphical representation of machine systems 101-103 of industrial automation environment 110. Aggregation server 108 receives operation data associated with an operation of the industrial automation environment over enterprise network 105 (operation 304). The operation data indicates the current status of machine systems 101-103, such as pressure, temperature, speed, or some other status data. In one embodiment, aggregation server 108 receives the operation data from HMI system 104. In another embodiment, aggregation server 108 receives the operation data from a machine system, such as one of machine systems 101-103.

Aggregation server 108 receives a request for a viewing session from a plurality of communication devices over a communication network 115 (operation 306). A viewing session comprises receiving from aggregation server 108 either graphics data or operation data, or both, on a remote communication device, such as communication device 120. A viewing session comprises identifying a view of at least an operation of a machine system, such as one of machine systems 101-103.

In response to receiving the request for a viewing session, aggregation server 108 transfers the graphics data over communication network 115 to the plurality of communication devices (operation 308). Also in response to receiving the request for the viewing session, aggregation server 108 transfers the operation data over communication network 115 to the plurality of communication devices (operation 310). In this manner, the plurality of communication devices receive the data requested without ever communicating with HMI system 104 or machine systems 101-103.

Figure 4:
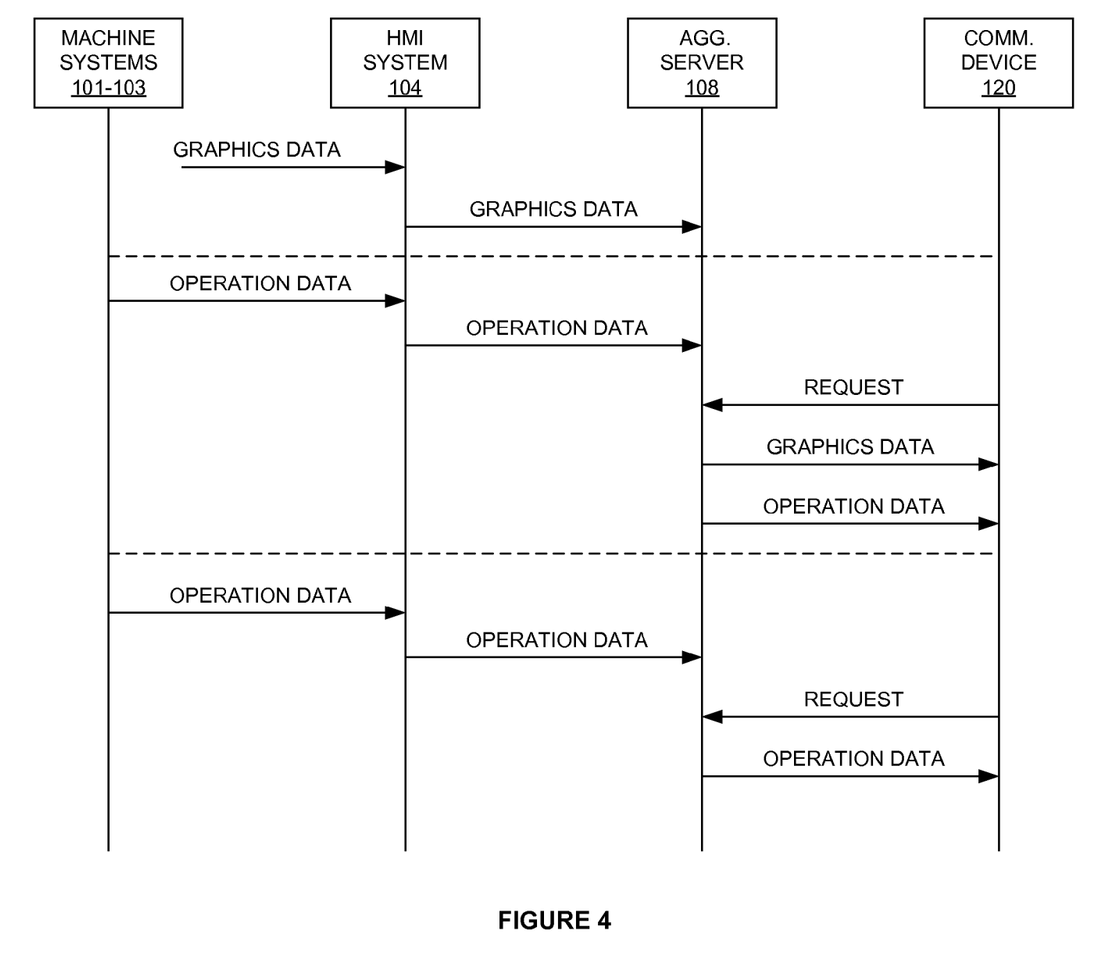
FIG. 4 is a sequence diagram illustrating a method of operating a data aggregation system.

FIG. 4 is a sequence diagram illustrating a method of operating data aggregation system 100. HMI system 104 receives graphics data in a variety of ways. For example, HMI system 104 might have various programmed display configurations representing different views of industrial automation environment 110 and machine systems 101-103. An operator of HMI system 104 might change a display configuration on HMI system 104. In another example, an operator might change the display configuration of HMI system 104 using communication device 120. In the examples listed above, HMI system 104 receives graphics data when an operator changes a display configuration of HMI system 104. When HMI system 104 receives graphics data, the graphics data is automatically sent to aggregation server 108.

At a later point in time (represented by the dashed lines in FIG. 4), machine systems 101-103 generate operation data, and transfer the operation data to HMI system 104. When HMI system 104 receives the operation data from machine systems 101-103, the operation data is automatically sent to aggregation server 108. In this manner, aggregation server 108 caches any data received by HMI system 104.

HMI system 104 may process the operation data to generate graphical displays that indicate the status of machine systems 101-103. Whenever HMI system 104 generates a graphical display of operation data, the graphical representation of the operation data is automatically sent to aggregation server 108.

A user desires to conveniently view graphics data and operation data from a remote communication device. The user operates communication device 120 to request a viewing session from aggregation server 108. In response to the request for the viewing session, aggregation server 108 transfers the graphics data and the operation data to communication device 120.

At a later point in time, machine systems 101-103 generate new operation data, and transfer the new operation data to HMI system 104. When HMI system 104 receives the new operation data from machine systems 101-103, the newly received operation data is automatically sent to aggregation server 108.

The user operates communication device 120 to request a viewing session from aggregation server 108. In response to the request for the viewing session, aggregation server 108 transfers the new operation data to communication device 120. In this example, the graphics data has not changed since communication device 120 last received the graphics data, so aggregation server 108 does not send graphics data to communication device 120 at this time.

Figure 5:
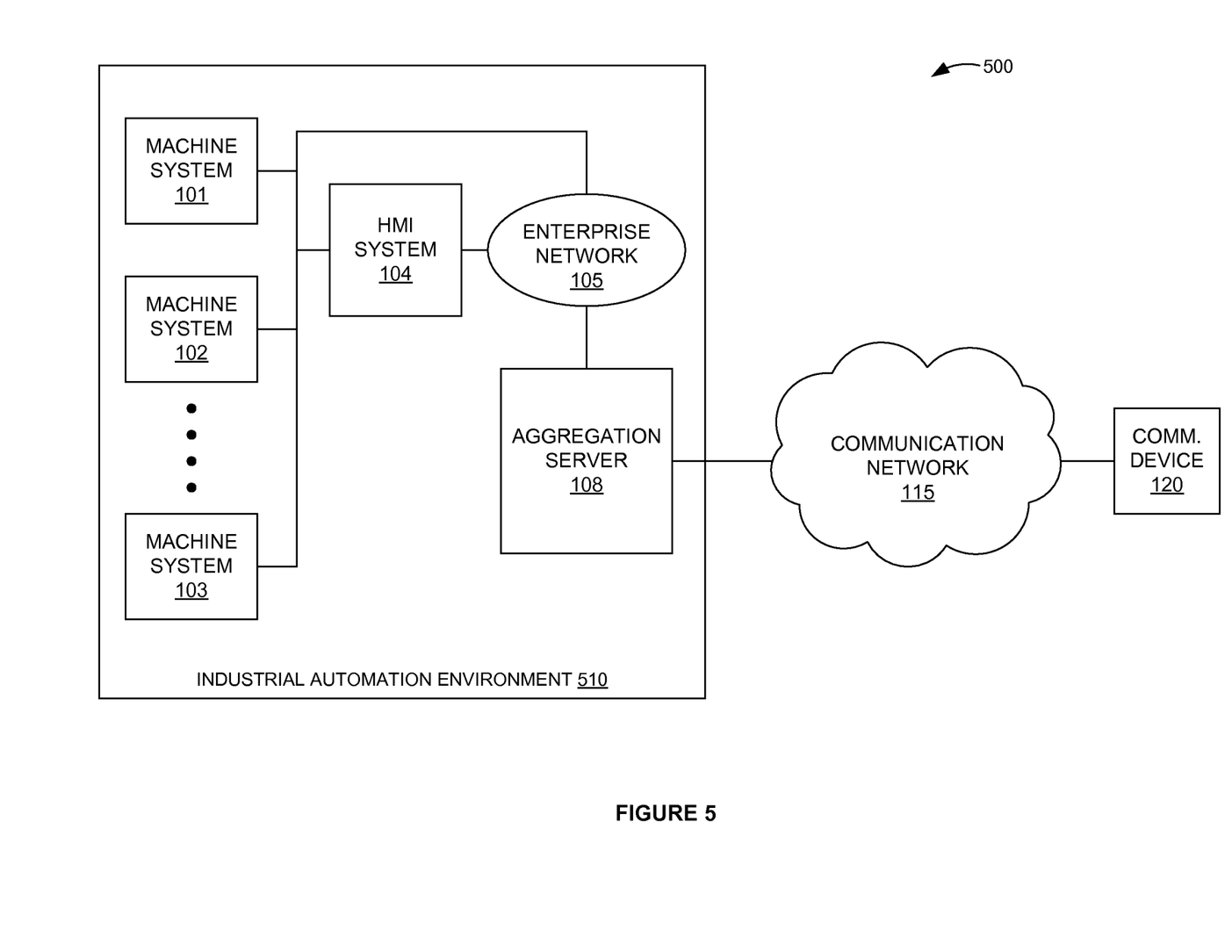
FIG. 5 is a block diagram illustrating a data aggregation system.

FIG. 5 is a block diagram illustrating data aggregation system 500. Data aggregation system 500 comprises machine systems 101-103, Human-Machine Interface (HMI) system 104, enterprise network 105, aggregation server 108, communication network 115, and communication device 120. The number of machine systems, HMI systems, and communication devices shown in FIG. 5 has been restricted for clarity, but there would typically be many more. Machine systems 101-103, HMI system 104, and aggregation server 108 communicate over enterprise network 105. Aggregation server 108 and communication device 120 communicate over communication network 115.

Industrial automation environment 510 includes machine systems 101-103, HMI system 104, enterprise network 105, and aggregation server 108. Industrial automation environment 510 comprises an automobile manufacturing factory, food processing plant, microprocessor fabrication facility, or some other type of industrial enterprise. Note that aggregation server 108 may not be located at the same physical premises as machine systems 101-103, but may be in communication with machine systems 101-103 and HMI system 104 over enterprise network 105 from many miles away.

Machine systems 101-103 continually produce operation data over time. Machine systems 101-103 are in communication with HMI system 104 and continually transfer the operation data to HMI system 104 over wireless links, metallic links, optical links, or some other communication link, including combinations thereof. In addition, machine systems 101-103 are in communication with aggregation server 108 and continually transfer the operation data to aggregation server 108 over enterprise network 105.

Machine systems 101-103 and HMI system 104 communicate with aggregation server 108 over enterprise network 105. Aggregation server 108 continually receives operation data from machine systems 101-103 and HMI system 104 over enterprise network 105.

Figure 6:
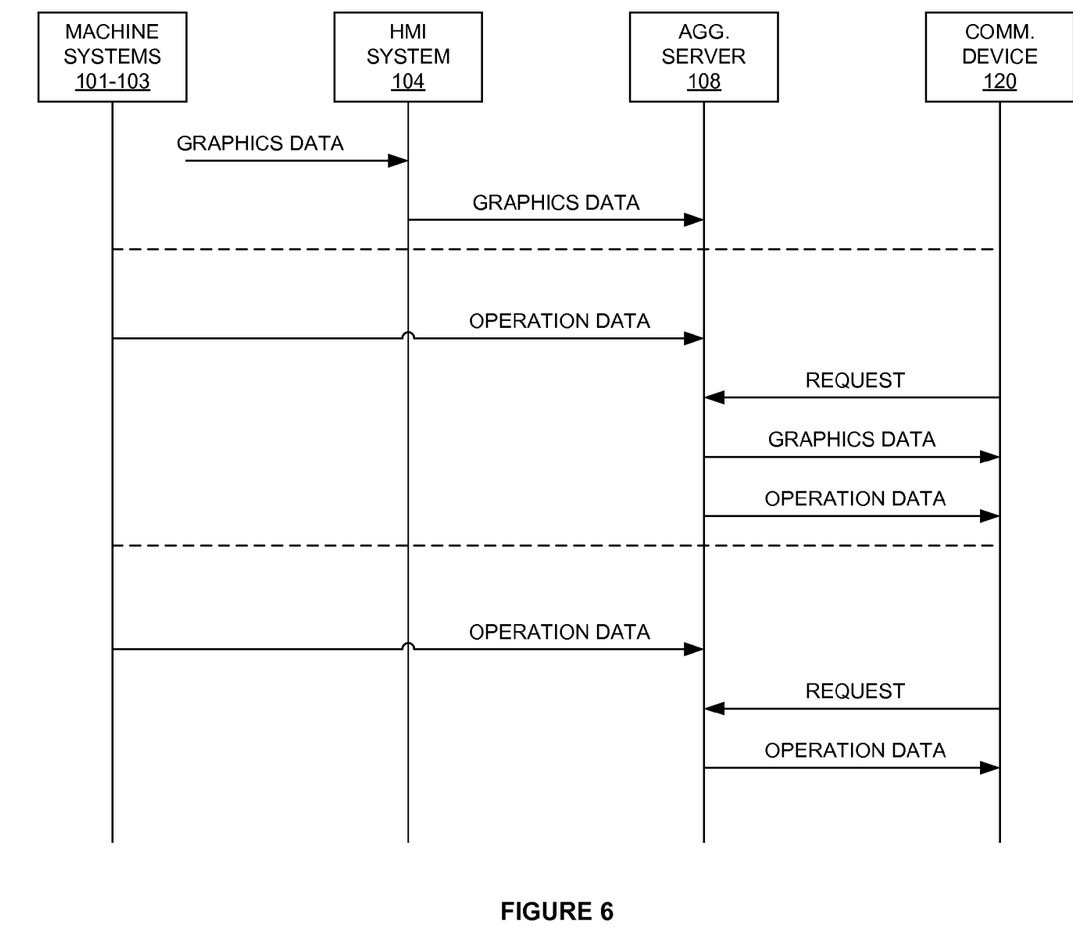
FIG. 6 is a sequence diagram illustrating a method of operating a data aggregation system.

FIG. 6 is a sequence diagram illustrating a method of operating data aggregation system 500. HMI system 104 receives graphics data in a variety of ways. For example, HMI system 104 might have various programmed display configurations representing different views of industrial automation environment 510 and machine systems 101-103. An operator of HMI system 104 might change a display configuration on HMI system 104. In another example, an operator might change the display configuration of HMI system 104 using communication device 120. In the examples listed above, HMI system 104 receives graphics data when an operator changes a display configuration of HMI system 104. When HMI system 104 receives graphics data, the graphics data is automatically sent to aggregation server 108.

At a later point in time (represented by the dashed lines in FIG. 6), machine systems 101-103 generate operation data. When machine systems 101-103 generate the operation data, the operation data is automatically sent to aggregation server 108. In this manner, aggregation server 108 caches any operation data generated by machine systems 101-103.

A user desires to conveniently view graphics data and operation data from a remote communication device. The user operates communication device 120 to request a viewing session from aggregation server 108. In response to the request for the viewing session, aggregation server 108 transfers the graphics data and the operation data to communication device 120.

At a later point in time, machine systems 101-103 generate new operation data. When machine systems 101-103 generate the new operation data, the newly generated operation data is automatically sent to aggregation server 108.

The user operates communication device 120 to request a viewing session from aggregation server 108. In response to the request for the viewing session, aggregation server 108 transfers the new operation data to communication device 120. In this example, the graphics data has not changed since communication device 120 last received the graphics data, so aggregation server 108 does not send graphics data to communication device 120 at this time.

Figure 7:
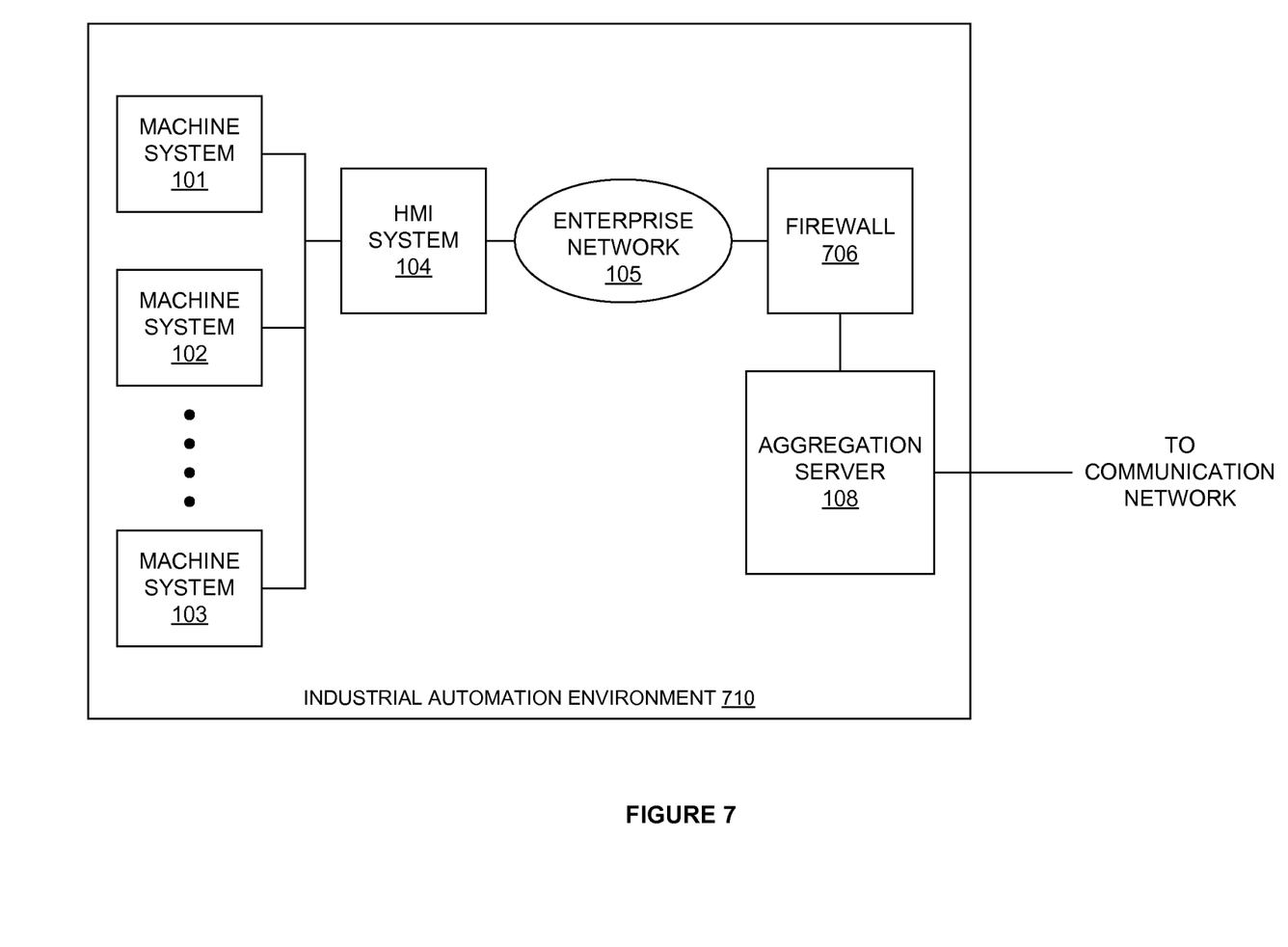
FIG. 7 is a block diagram illustrating an industrial automation environment.

FIG. 7 is a block diagram illustrating industrial automation environment 710. Industrial automation environment 710 comprises machine systems 101-103, Human-Machine Interface (HMI) system 104, enterprise network 105, firewall 706, and aggregation server 108. The number of machine systems and HMI systems shown in FIG. 7 has been restricted for clarity, but there would typically be many more. Industrial automation environment 710 comprises an automobile manufacturing factory, food processing plant, microprocessor fabrication facility, or some other type of industrial enterprise. Note that aggregation server 108 and firewall 706 may not be located at the same physical premises as machine systems 101-103, but may be in communication with HMI system 104 over enterprise network 105 from many miles away.

HMI system 104 communicates with aggregation server 108 over enterprise network 105 through firewall 706. Aggregation server 108 communicates with one or more communication devices, such as communication device 120, over a communication network, such as communication network 115.

Firewall 706 is capable of permitting, denying, encrypting, or decrypting all network traffic to and from enterprise network 105 based upon a set of rules and other criteria. Firewall 706 comprises computer and communication equipment and software. Firewall 706 allows aggregation server 108 to access enterprise network 105, which is in communication with HMI system 104. Firewall 706 forces a communication device such as communication device 120 through aggregation server 108, and prevents such a communication device from accessing enterprise network 105 and HMI system 104.

Firewall 706 could also be placed between enterprise network 105 and aggregation server 108 in industrial automation environment 510 of FIG. 5. In this case, firewall 706 would prevent communication device 120 from accessing machine systems 101-103 and HMI system 104 through enterprise network 105.

Firewall 706 comprises a communication interface and a processing system. The processing system includes a storage system. The storage system stores software. The processing system is linked to the communication interface. Firewall 706 could be comprised of a programmed general-purpose computer, although those skilled in the art will appreciate that programmable or special purpose circuitry and equipment may be used.

The communication interface could comprise a network interface, modem, port, transceiver, or some other communication device. The processing system could comprise a computer microprocessor, logic circuit, or some other processing device. The storage system could comprise a disk, integrated circuit, server, or some other memory device. The above-described components of firewall 706 may be integrated together or distributed among multiple devices.

The processing system retrieves and executes the software from the storage system. The software may comprise an operating system, utilities, drivers, networking software, and other software typically loaded onto a computer system. The software could comprise an application program, firmware, or some other form of machine-readable processing instructions. When executed by the processing system, the software directs firewall 706 to operate as described herein.

Advantageously, a user of communication device 120 is able to easily request and receive graphics data and operation data without directly communicating with machine systems 101-103 and HMI system 104. By placing aggregation server 108 in communication with HMI system 104 and machine systems 101-103 to automatically cache data generated by such systems, requests for operation and graphics data from remote communication devices are serviced by aggregation server 108. Thus, by utilizing aggregation server 108, HMI system 104 and machine systems 101-103 are not required to provide such data to communication device 120 on demand. By utilizing firewall 706, communication device 120 is prevented from accessing enterprise network 105. Thus, strain on enterprise network 105 resources is reduced through use of firewall 706 and aggregation server 108.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A human machine interface (HMI) device for use in an industrial automation environment, comprising:
    a user interface configured to display on the HMI device a graphical representation of operation data of at least one machine system in the industrial automation environment;
    a processing system configured to generate graphics data comprising the graphical representation for viewing consumption by a remote communication device;
    a communication interface configured to:
        transfer the graphics data for delivery to an aggregation server without regard to requests for the graphics data by the remote communication device;
        transfer operation data associated with operations of the at least one machine system to the aggregation server without regard to requests for the graphics data by the remote communication device;
    wherein the aggregation server caches the graphics data received from the HMI device and caches the operation data; and
    wherein, responsive to a request for a viewing session from the remote communication device, the aggregation server is configured to:
    transfer the operation data to the remote communication device;
    transfer the graphics data to the remote communication device if the graphics data has changed since the remote communication device last received graphics data; and
    withhold transferring the graphics data to the remote communication device if the graphics data has not changed since the remote communication device last received graphics data.

2. The HMI device of claim 1, comprising:
    the communication interface configured to transfer instructions to control operations of the at least one machine system in the industrial automation environment.

3. The HMI device of claim 1, wherein the HMI device is located proximate to the at least one machine system, and wherein the aggregation server is located remotely from the HMI device and the industrial automation environment.

4. The HMI device of claim 1, wherein the communication interface is configured to transfer the graphics data for delivery to the aggregation server over the Internet, and wherein the aggregation server transfers the graphics data for delivery to the remote communication device over the Internet.

5. The HMI device of claim 1, comprising:
    the processing system configured to identify a changed graphical representation of the operation data, and generate new graphics data comprising the changed graphical representation for viewing consumption by the remote communication device; and
    the communication interface configured to transfer the new graphics data for delivery to the aggregation server.

6. The HMI device of claim 5, comprising:
the processing system configured to identify the changed graphical representation based on an operator interaction with the user interface of the HMI device.

7. The HMI device of claim 5, comprising:
the processing system configured to identify the changed graphical representation based on an operator interaction with the remote communication device.

8. A non-transitory computer-readable storage medium comprising instructions for operating a human machine interface (HMI) device for use in an industrial automation environment, wherein the instructions, when executed by the HMI device, direct the HMI device to:
display on the HMI device a graphical representation of operation data of at least one machine system in the industrial automation environment;
generate graphics data comprising the graphical representation for viewing consumption by a remote communication device;
transfer the graphics data for delivery to an aggregation server without regard to requests for the graphics data by the remote communication device;
transfer operation data associated with operations of the at least one machine system to the aggregation server without regard to requests for the graphics data by the remote communication device;
wherein the aggregation server caches the graphics data and operation data received from the HMI device; and
wherein, in response to a request for a viewing session from the remote communication device, the aggregation server transfers the operation data to the remote communication device, transfers the graphics data to the remote communication device if the graphics data has changed since the remote communication device last received graphics data, and withholds transferring the graphics data to the remote communication device if the graphics data has not changed since the remote communication device last received graphics data.

9. The non-transitory computer-readable storage medium of claim 8, comprising further instructions, that when executed by the HMI device, direct the HMI device to:
transfer instructions to control operations of the at least one machine system in the industrial automation environment.

10. The non-transitory computer-readable storage medium of claim 8, wherein the HMI device is located proximate to the at least one machine system, and wherein the aggregation server is located remotely from the HMI device and the industrial automation environment.

11. The non-transitory computer-readable storage medium of claim 8, comprising further instructions, that when executed by the HMI device, direct the HMI device to:
transfer the graphics data for delivery to the aggregation server over the Internet, and wherein the aggregation server transfers the graphics data for delivery to the remote communication device over the Internet.

12. The non-transitory computer-readable storage medium of claim 8, comprising further instructions, that when executed by the HMI device, direct the HMI device to:
identify a changed graphical representation of the operation data;
generate new graphics data comprising the changed graphical representation for viewing consumption by the remote communication device; and
transfer the new graphics data for delivery to the aggregation server.

13. The non-transitory computer-readable storage medium of claim 12, comprising further instructions, that when executed by the HMI device, direct the HMI device to:
identify the changed graphical representation based on an operator interaction with the user interface of the HMI device.

14. The non-transitory computer-readable storage medium of claim 12, comprising further instructions, that when executed by the HMI device, direct the HMI device to:
identify the changed graphical representation based on an operator interaction with the remote communication device.

* * * * *